United States Patent
Gammel et al.

(10) Patent No.: US 7,124,275 B2
(45) Date of Patent: Oct. 17, 2006

(54) APPARATUS AND METHOD FOR DETERMINING A PHYSICAL ADDRESS FROM A VIRTUAL ADDRESS BY USING A HIERARCHICAL MAPPING REGULATION WITH COMPRESSED NODES

(75) Inventors: Berndt Gammel, Markt-Schwaben (DE); Christian May, Munich (DE); Ralph Ledwa, Marktoberdorf (DE); Holger Sedlak, Sauerlach (DE)

(73) Assignee: Infineon Technologies AG, Munich (DE)

( * ) Notice: Subject to any disclaimer, the term of this patent is extended or adjusted under 35 U.S.C. 154(b) by 144 days.

(21) Appl. No.: 10/480,081

(22) PCT Filed: May 14, 2002

(86) PCT No.: PCT/EP02/05319

§ 371 (c)(1),
(2), (4) Date: Aug. 17, 2004

(87) PCT Pub. No.: WO02/099645

PCT Pub. Date: Dec. 12, 2002

(65) Prior Publication Data

US 2005/0015378 A1    Jan. 20, 2005

(30) Foreign Application Priority Data

Jun. 5, 2001  (DE) ............................... 101 27 198

(51) Int. Cl.
*G06F 12/00* (2006.01)
(52) U.S. Cl. .................. 711/203; 711/206; 711/221
(58) Field of Classification Search ................ 711/203, 711/206, 221
See application file for complete search history.

(56) References Cited

U.S. PATENT DOCUMENTS

| | | |
|---|---|---|
| 4,758,946 A | 7/1988 | Shar et al. |
| 5,696,927 A | 12/1997 | MacDonald et al. |
| 5,790,979 A | 8/1998 | Liedtke |

(Continued)

FOREIGN PATENT DOCUMENTS

DE    44 05 845.4 A1    11/1994

OTHER PUBLICATIONS

Liedtke, Jochen et al. "Guarded Page Tables on Mips R4600 or An Exercise in Architecture-Dependent Micro Optimization," Operating Systems Review (SIGOPS), ACM Headquater, New York, USA, Bd. 30, No. 1, 1996, pp. 4-15, XP 000584869.

(Continued)

*Primary Examiner*—Reba I. Elmore
(74) *Attorney, Agent, or Firm*—Baker Botts L.L.P.

(57) ABSTRACT

A method for determining a physical address from a virtual address, wherein a mapping regulation between the virtual address and the physical address is implemented as hierarchical tree structure with compressed nodes. First, a compression indicator included in the mapping regulation is read, and a portion of the virtual address associated with the considered node level is read. Using the compression indicator and the portion of the virtual address, an entry in the node list of the considered node is determined. The determined entry is read, whereupon the physical address can be determined directly, if the considered node level has been the hierarchically lowest node level. If higher node levels to be processed are present, the previous steps in determining the physical address for compressed nodes of lower hierarchy level are repeated until the hierarchically lowest node level is reached.

11 Claims, 13 Drawing Sheets

U.S. PATENT DOCUMENTS 5,949,911 A * 9/1999 Chui et al. ................... 382/240
6,003,123 A * 12/1999 Carter et al. ................. 711/207
6,067,574 A * 5/2000 Tzeng ......................... 709/247
6,112,286 A * 8/2000 Schimmel et al. ........... 711/208

OTHER PUBLICATIONS

Patterson, David A. "Computer Architecture: a quantitative approach," 2nd Edition, Morgan Kaufmann Publishers, Inc., 1996, pp. 449-453.

* cited by examiner

FIG 4B

| level | portion | address area in bytes |
|---|---|---|
| 1 | $VEA_{10-6}$ | $2K(2^{11})$ |
| 2 | $VEA_{14-11}$ | $32K(2^{15})$ |
| 3 | $VEA_{18-15}$ | $512K(2^{19})$ |
| 4 | $VEA_{22-19}$ | $8M(2^{23})$ |
| 5 (root) | $VEA_{23}$ | $16M(2^{24})$ |

| level | portions of the virtual address in bits | node size (max. number of entries in the node list) |
|---|---|---|
| 5 | 23 | 2 |
| 4 | 22 : 19 | 16 |
| 3 | 18 : 15 | 16 |
| 2 | 14 : 11 | 16 |
| 1 | 10 : 6 | 32 |
| 0 | 5 : 0 | 64 |

APPARATUS AND METHOD FOR DETERMINING A PHYSICAL ADDRESS FROM A VIRTUAL ADDRESS BY USING A HIERARCHICAL MAPPING REGULATION WITH COMPRESSED NODES

BACKGROUND OF THE INVENTION

1. Field of the Invention

The present invention relates to computer systems and especially to computer systems with virtual addressing.

2. Description of the Related Art

Virtual addressing has been known for a while from the field of workstations. By using a certain mapping regulation virtual addresses are mapped to physical addresses. The physical addresses address memory cells of a physical memory, such as the working memory, a hard drive, a tape memory, etc. Virtual addresses however, do not reference directly to physical memory cells but merely indirectly via the mapping regulation. It is the advantage of this type of addressing that the programmer of an application does not have to take care of the different physical memories present in a computer system. The programmer has a virtual address space at his hands that he can use for his program as required. The mapping to the physical address space that a special computer system makes available is generated separately from the program code so that by making available different mapping regulations a program programmed with virtual addresses can run on different computer systems.

In a processor with a virtual memory system an application runs in a so-called virtual address space. Each address of the virtual memory where data read/writable by the application or executable code exist is mapped to an address on the physical memory where those data or this code is actually stored. The virtual address (VA) and the physical address (PA) associated via the mapping regulation do not need to have any relation at all. Further, the virtual address space can be significantly larger than the physical address space.

Virtual addresses without read/writable data or executable code are normally not mapped to a physical memory. This mapping is totally transparent for the processed application.

When organizing the memory in pages, the virtual address space is divided into equal overlapping-free memory areas. One page in the physical address space is associated to a page in the virtual address space via the mapping regulation; the page in the physical address space is also referred to as page frame.

The payload data memory of a page frame of the physical address space has the same size as a page of the virtual address space.

The allocation of a virtual page to a physical page is usually achieved by the so-called page table, comprising address pairs of respective start addresses of the virtual pages and the associated physical pages.

In workstations, part of the page table is in a cache that is also referred to as "Translation Look Aside Buffer (TLB)". If the start address pair for a virtual page and the associated physical page is in the TLB, then the calculation of the address mapping into the virtual memory area happens accelerated since only one access to a table is necessary in order to obtain the physical address associated to a virtual address.

If the start address pair, i.e. the virtual address and its associated physical address is in the TLB, then a TLB miss takes place, which usually leads to a trap to the operating system which has to add the address tupel to the TLB.

In the area of workstations, the mapping regulation between virtual address space and physical address space that can, for example, be implemented as a single page table, is held in the volatile working memory. When a workstation is booted up, it first starts in the real addressing mode. This means that the operating system of the workstation causes the CPU of the workstation to gradually set up a page table in the volatile working memory in the workstation in the real, i.e. physical addressing mode. Only when a page table is constructed, the workstation can switch to the virtual addressing mode. If the CPU asks for data at a virtual address, then the associated physical address is determined in the volatile working memory of the CPU in order to be able to fetch data from the memory. Common workstations are therefore distinguished by the fact that they boot up in a real addressing mode and then switch to the virtual addressing mode when the mapping regulation from the virtual address space to the physical address space in the volatile memory is set up.

It is one disadvantage of this concept that a relatively large working memory area is necessary in order to store a page table. This disadvantage is not of high importance for workstations, since they have large amounts of working memory available. For other applications, such as for security relevant computer systems, such as implemented in chip card ICs, the memory resources are limited due to the small available space. The provision of an amount of volatile working memory to store a page table leads to the fact that the application carried out on the chip card might have too little working memory and therefore experience performance losses.

It is another disadvantage of the known concept that a significant management effort is necessary to, at first, set up the page table when booting up the computer system, i.e. to gradually calculate the address allocations from the stored information and to store them. Besides the fact that computer resources are necessary for that, respective programs also have to be made available on a chip card in order to take the necessary precautions for the virtual addressing mode. Such programs also need memory space that is a limited resource, especially in chip cards or other security ICs, due to reasons of space.

In the specialist book "Computer Architecture: a quantitative approach" by David A. Patterson, second edition, 1996, Morgan Kaufmann Publishers, Inc., pages 449–453 the memory management of the alpha AXP processor is described. A hierarchical tree structure with three levels is used here as mapping regulation for determining a physical address from a virtual address. One node level comprises at least one node with a page table. The virtual address is divided into portions, wherein each portion of the virtual address is associated to a node level. The address translation begins with adding the highest-level address field to a page table base register, whereupon the memory is read out at this position to obtain the basis of the page table of the second level. The address field of the virtual address for the second level is then again added to this newly fetched address. Then the memory is accessed again to obtain the basis of the page table of the third level. The address field of the third level is added to this base address, whereupon the memory is read out by using this sum to obtain the physical address of the page that is referenced. A page offset is added to this address to obtain the physical address associated to the virtual address. Each page table in the alpha AXP architecture fits into a single page, so that all page table addresses are physical addresses that do not need any further translation. Each page table for each node level is therefore exactly one physical page long.

If the virtual address space is larger than the physical address space, which is especially an advantage when flexibility for future expansions of the physical address space is wanted, the page tables, i.e. the node lists of the nodes, contain a large number of zero entries, i.e. of entries that do not reference to a physical address or to no node of a lower node level. Due to the fact that each page table is exactly one physical memory page long, the known hierarchical addressing wastes a lot of memory space. The amount of wasted memory space is getting larger the larger the virtual address space is in comparison to the physical address space. The memory taken up by zero entries in the node lists leads to the fact that more memory space, for example in form of an external RAM has to be made available, especially in computer systems with limited memory resources, as they can be found on chip cards, smart cards or security ICs, which makes a chip card more expensive. If, however, due to reasons of chip space no further memory can be made available especially the working memory resources of the chip cards are more limited than absolutely necessary, which leads to the fact that less expensive programs can be computed in the chip card or that the performance of the chip card suffers.

SUMMARY OF THE INVENTION

It is the object of the present invention to provide a more efficient concept for determining a physical address from a virtual address as well as a more efficient computer system.

In accordance with a first aspect, the present invention provides a method for determining a physical address from a virtual address by using a hierarchical mapping regulation with hierarchically arranged node levels, wherein a virtual address space is larger than a physical address space, the virtual address having portions, one portion of the virtual address being associated to a node level, the node level having at least one node, each node having a node list with list entries, a list entry of a node list referring to a node of a hierarchically lower node level, wherein by using a list entry of a node list of a hierarchically lower node level the physical address can be determined, a length of the portion of the virtual address defining a maximum number of entries of a node list of a node belonging to the node level associated to the portion, a node, whose node list has a lower than the maximum number of entries, being a compressed node, and the mapping regulation having a compression indicator associated to a compressed node, having reading the compression indicator; reading a portion of the virtual address; determining an entry in a node list of a node of a node level associated to the read portion of the virtual address, by using the read portion of the virtual address and the compression indicator; reading the determined entry of the node list to identify a node of a hierarchically lower node level referenced by the determined entry; and determining the physical address by using the node of the hierarchically lower node level referenced by the determined entry.

In accordance with a second aspect, the present invention provides an apparatus for determining a physical address from a virtual address by using a hierarchical mapping regulation with hierarchically arranged node levels, a virtual address space being larger than a physical address space, the virtual address having portions, one portion of the virtual address being associated to a node level, the node level having at least one node, each node having a node list with list entries, a list entry of a node list referring to a node of a hierarchically lower node level, wherein by using a list entry of a node list of a hierarchically lower node level the physical address can be determined, a length of the portion of the virtual address defining a maximum number of entries of a node list of a node belonging to the node level associated to the portion, a node, whose node list has a lower than the maximum number of entries, being a compressed node, and the mapping regulation having a compression indicator associated to a compressed node, having means for reading the compression indicator; means for reading a portion of the virtual address; means for determining an entry in a node list of a node of the node level associated to the read portion of the virtual address, by using the virtual address, by using the read portion of the virtual address and the compression indicator; means for reading the determined entry of the node list to identify a node of a hierarchically lower node level which is referenced by the determined entry; and means for determining the physical address by using the node of the hierarchically lower node level which is referenced by the determined entry.

The present invention is based on the knowledge that a compression of node lists has to be carried out to reduce the memory space taken up by the hierarchical mapping regulation between virtual address and physical address. According to the invention, a compressing indicator that is used in determining an entry in a node list of a node together with a respective portion of the virtual address to read the determined entry and then to find out the physical address by using the determined entry is stored together with a mapping regulation in an addressing structure where the virtual address space is larger than the physical address space and where hierarchical disposed node levels are present. The hierarchical mapping regulation comprises hierarchically disposed node levels, one node level having at least one node. A node list of list entries is associated to each node. Further, the virtual address has portions, always one portion of the virtual address being associated to one node level.

The node list of a node level comprises list entries, each list entry identified by an index, and each list entry comprising a reference to a node of a hierarchically lower node level. The physical address is determinable by using a list entry of a node of a hierarchically lowest node level, either as a direct physical address or, if an addressing by pages is used, by using the base address and the offset value of the physical memory page.

The length of a portion of the virtual address defines a maximum number of entries of a node list of a node. If one portion of the virtual address has a length of, for example, four bits, a node of a node level associated to this portion of the virtual address, for example a maximum of 16 list entries, if node compression is present, since 16 different indices for 16 different node entries can be signaled.

According to the invention, a node whose node list has a lesser than maximum number of entries is a compressed node. This fact and the way in which a node is compressed are given by a compressing indicator indicating a compressed node.

In a preferred embodiment of the present invention compressions of nodes are preferred, which comprise a compression to one half of the list entries compared to the maximum number, to one quarter of list entries compared to the maximum number, to one eighth of list entries in comparison to the maximum number, etc. Preferably, compression is carried out when the most significant bits of all list entries of an uncompressed node list are equal. Then, compression by one half can be achieved and the most significant bit of the respective portion of the virtual address is ignored in indexing the node list, due to the node indicator of the mapping regulation.

Further, if the two most significant bits of all non-zero entries in an uncompressed node list are equal, a compression to a quarter of the uncompressed node list is achieved, and the two most significant bits of the respective portion of the virtual address are ignored in the indexing of a node list due to the node indicator.

If the three most significant bits of all non-zero entries in an uncompressed node list are equal, a compression to one eighth of the maximum number of node list entries can be achieved, etc.

Different possibilities for storing the compression indicators exist. Generally, it has to be made sure that in address translating the compression indicator for a node list is read before the node list entry is indexed. A preferred form for storing the compression indicator is to write it into a list entry of a node of a higher node level so that in address translating it can be found out already when reading the list entry of a higher node level, whether the node list referenced by the read list entry is compressed and if the compression type is not standard, how it is compressed. Alternatively, the compression indicator can also be, for example, in a default position, even in the compressed node list itself, which is always accessed before a special entry of the node list is indexed.

It is one advantage of the present invention that compressed node lists need less physical memory space than the non-compressed node lists so that this gained memory space is available.

In a preferred embodiment of the present invention where an addressing by pages structure is used the node lists are no longer stored in individual physical memory pages, but as many node lists as possible are stored in the same physical memory page so that the case occurs that several node lists of nodes of the same node level are arranged in the same physical memory page or even several node lists of nodes of different node levels are stored in the same physical memory page. This has the advantage that the physical memory is "tidy", so that not only parts of memory pages but whole memory pages, which are not taken up by the mapping regulation, are available for other data. Thereby, a fragmentation of the physical address space is counteracted.

In a preferred embodiment of the present invention at least part of the mapping regulation and especially merely the root node itself or even only a reference to it and a generating regulation for the mapping regulation is stored by using the reference in a non-volatile memory, so that the computer system with the inventive addressing can already boot up in the virtual mode.

According to a preferred embodiment, the security of a computer system with virtual addressing is improved by the fact that the computer system does not use a physical addressing mode, but works in the virtual addressing mode from the beginning. To achieve that, the hierarchical mapping regulation by which a physical address can be determined from a virtual address is stored in a non-volatile memory of the computer system. The mapping regulation is stored in the non-volatile memory so that it is immediately present in booting up the computer system and does not have to be generated in a real mode first and then stored in a volatile memory as in the prior art. Thereby the complete management effort and the required programs to generate a mapping regulation, for example in the shape of a hash table, becomes obsolete, since the mapping regulation is already fully available in the non-volatile memory.

For the computer system to boot up in the virtual addressing mode, apart from the non-volatile memory where the mapping regulation is stored, a hardware state machine is provided that can access the non-volatile memory and is designed to determine the physical address associated with the virtual address by using the virtual address and the mapping regulation. The hardware state machine executes a predetermined algorithm automatically, as it is common for state machines, wherein the algorithm executed by the hardware state machine obtains, on the one hand, input data from the non-volatile memory, and on the other hand the virtual address as input data to output the physical address as output data.

Inventively, however, it is preferred to store the mapping regulation in the shape of a hierarchical tree with one root not for a root level, at least one intermediate node for at least one intermediate level and an end node for an end level, so that the hardware state machine controlled by the virtual address and the lists for the individual node stored in the non-volatile memory performs a so-called page table walk to output the physical address corresponding to the virtual address after passing through the tree. In a preferred embodiment of the present invention, where the virtual address space is significantly larger than the physical address space, and lists for nodes therefore have relatively few used entries and relatively many zero entries, the lists for nodes of the hierarchical tree are compressed to save memory space in the non-volatile memory.

In the case of the hierarchically organized mapping regulation between virtual and physical address not the whole mapping regulation has to be stored in the non-volatile memory, but at least part of the mapping regulation by which it is possible to start a boot up process of the system in the virtual mode. In appropriate list entries in the virtual mode it is then possible to generate the remaining part of the mapping regulation in the volatile memory already when retrieving the needed data from the physical memory and use it for further address translation from virtual to physical. The hardware state machine can therefore also access data programmed in the volatile memory during runtime after boot up of the system in the virtual mode.

Further, in a preferred embodiment of the present invention, addressing by pages is preferred. To avoid memory fragmentation in this case as many combined lists as possible are stored in the same physical page.

It is another advantage of the present invention that in the case of the mapping regulation as hierarchical tree structure a differentiated access right placing with an adjustable granularity can be achieved by implementing access rights at the node of the tree.

It is another advantage of the present invention that by storing the mapping regulation in non-volatile memory in a form as it can be used by the hardware state machine without intervention of the CPU, CPU resources will be saved. The mapping regulation, for example the page table or the hierarchical structure of node lists has of course to be generated. This, however, can be performed outside the operation of the computer system, so to speak "off line" or in the case of a chip card "off card". Generating the mapping regulation and storing the mapping regulation in non-volatile memory does therefore not need any valuable online resource of memory or CPU but can be performed when there is enough time, for example in the production of the chip card or in the case of a dynamic modification of the mapping regulation when the computer system does not carry out any security relevant application. Inventively, therefore, processing steps can be transferred out of the online operation in order to make valuable online resources, such as computer performance, memory space, energy consumption etc. available, or to save it.

BRIEF DESCRIPTION OF THE DRAWINGS

Preferred embodiments of the present invention will be discussed in more detail below with reference to the accompanying drawings. They show:

FIG. 4b is a table for representation of the node levels and the address areas addressed by a node;

FIG. 5 is an example for a mapping regulation in the shape of a hierarchical tree structure where intermediate nodes can be skipped;

FIG. 6 is a table for the representation of node sizes on different levels for the example of FIG. 4a;

DESCRIPTION OF PREFERRED EMBODIMENTS

Figure 1:
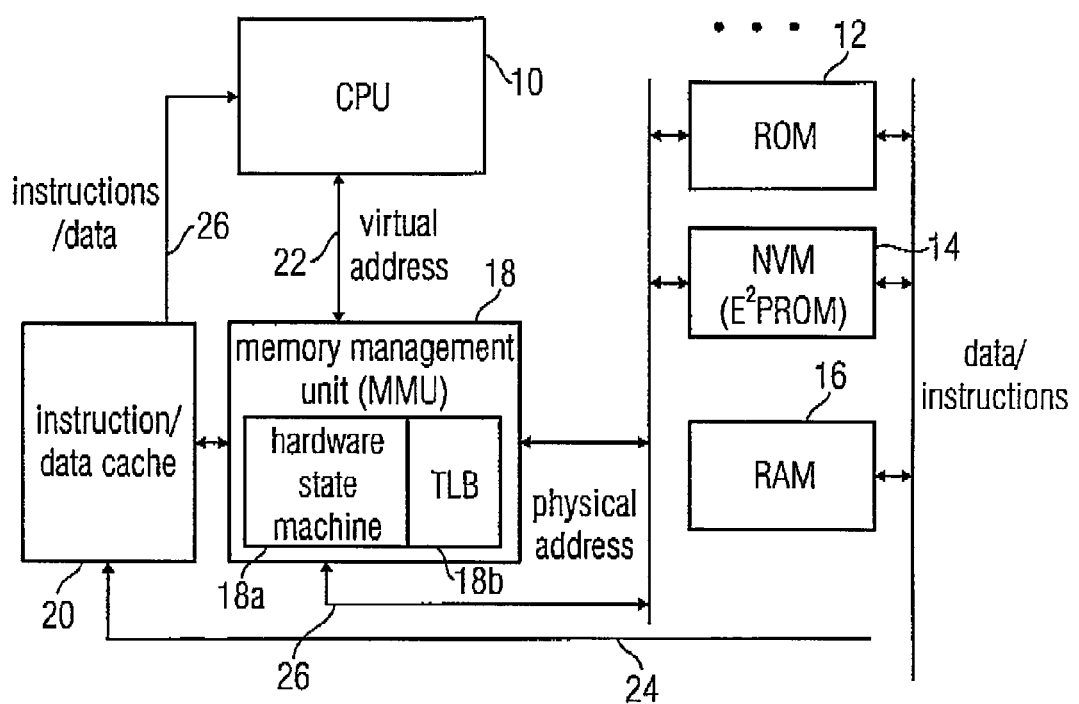
FIG. 1 is a computer system with virtual addressing.

FIG. 1 shows a computer system with a CPU 10, a non-volatile memory in the form of a ROM 12 and an E²PROM 14, referred to as NVM (NVM=non-volatile memory) in FIG. 1. The computer system can further comprise a volatile memory 16, referred to as RAM in FIG. 1, and maybe further peripheral components, such as a co-processor, an input/output interface, a random number generator, etc.

The computer system further has a memory management unit (MMU) 18 as well as a cache 20, wherein the cache 20 can be split into an instruction cache and data cache if the computer system is constructed according to Harvard architecture. The CPU is connected to the memory management unit 18 via a bus 22 for virtual addresses. The memory management unit 18 comprises a hardware state machine 18a as well as preferably a translation look aside buffer (TLB) 18b to generate a physical address from a virtual address supplied by the CPU 10 via bus 22, to address data associated to a virtual address from a memory 12, 14, 16 and load them via a data/instruction bus 24 into the cache 20, from which the CPU 10 obtains data associated to a virtual address via another instruction/data bus 26.

It can further be seen from FIG. 1 that the hardware state machine 18a of the memory management unit 18 can access a non-volatile memory in the shape of ROM 12 or NVM 14 via an access bus 26 to load the mapping regulation necessary for calculation of the physical address out of the virtual address from the non-volatile memory. The hardware state machine 18a can therefore access the non-volatile memory via the access bus 26 to determine the physical address associated to the virtual address by using a virtual address and the mapping regulation stored in the non-volatile memory.

It can be seen from FIG. 1 that the CPU 10 addresses preferably exclusively via the virtual address bus 22, and mainly the hardware state machine 18a that can access the non-volatile memory directly so that the computer system does not need a physical addressing mode but can boot up in the virtual addressing mode, so that there is no point of attack in the form of an operating system of the computer system running in a physical addressing mode.

Figure 2:
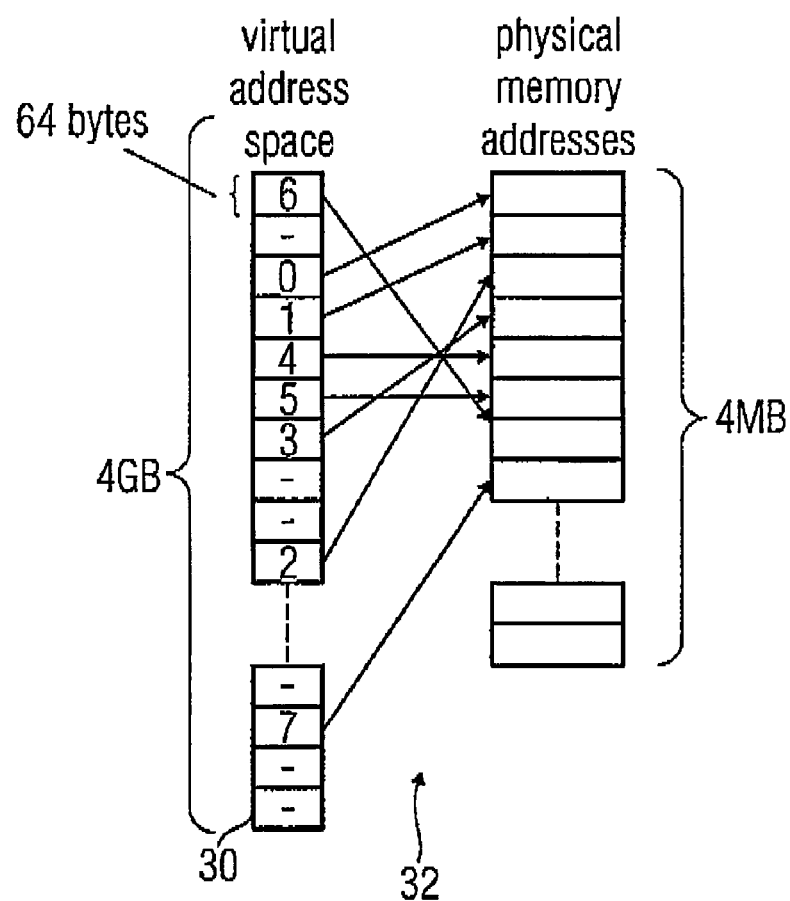
FIG. 2 is a schematic representation of a mapping of a virtual address space to a physical address space for a computer system on a chip card.

In the following, virtual memory systems will be discussed in general. A protection mechanism for multitasking computer system comprises associating separate virtual address spaces to separate processors or applications, so that a multitasking operation with different applications is possible, these applications, however, have to be totally separated from one another due to security reasons. In a preferred embodiment of the computer system suited for a chip card, a virtual address space of 4 GB is provided, as can be seen in FIG. 2. The address space is divided into virtual memory pages 30 for better efficiency, wherein one memory page has a size of 64 bytes, which means 512 bits. The memory pages of the virtual address space can be addressed by a 32 bit wide virtual address.

Essential about a concept of the virtual addressing is that an application that is running on the CPU cannot access the physical memory directly but only its own virtual address space. By using the memory management unit 18 of FIG. 1 the virtual address space is mapped to a physical memory address by using a mapping regulation 32, which is symbolized by the arrows shown in FIG. 2. In the embodiment shown in FIG. 2, the physical address space is fixed to 4 MB, it has to be noted, however, that an ordinary chip card does by far not have so much memory. Typical memory sizes for the E²PROM 14 of FIG. 1 are 64 Kbytes. The RAM 16 of FIG. 1 typically has 8 Kbytes while the ROM of FIG. 1 typically has 168 bytes. If a virtual address space of 4 GB is mapped to maybe 240 byte memory cells it can be seen that at first a large number of physical memory addresses do not point to actually existing physical memory cells. On the other hand, the over-dimensioning of the virtual address space in comparison to the physical address space and the over dimensioning of the physical address space regarding the actually existing memory cells allows simple modifications in that additional memory can easily be inserted later, or that the physical address space can be extended as needed.

As it will be discussed below the mapping regulation 32 is not constructed by the CPU in the RAM 16, but for example, developed during the production of the chip card and programmed into the ROM 12 in the shape of a respectively shaped ROM mask before the computer system is put into operation. During operation the computer system therefore does not need any resources for generating the mapping regulation 32 apart from the state machine. The required steps have already been performed off line, so they do not have to take up valuable online capacities of the computer system.

A virtual address is translated into a respective physical address, for example by using a translation table that is usually referred to as page table. The page table can be organized in the form of a single table with entries, wherein each entry comprises a virtual address and the physical address associated thereto. As will be discussed below, it is, however, preferred to organize the mapping regulation in the shape of a hierarchical page association tree. A so-organized mapping regulation has the advantage of greater flexibility for managing access rights. Further, it is more suitable for handling small page sizes, which is of importance when the computer system is used as security IC in a chip card. Smaller page sizes, e.g. smaller or equal to 256 bytes further serve to avoid a page table fragmentation. Therefore, a memory page has e.g. a size of 64 bytes, i.e. 512 bits, as has been described referring to FIG. 2. This means that the page offset has to have a length of 6 bits in order to be able to address the 64 bytes starting from the start address for the page.

Figure 3:
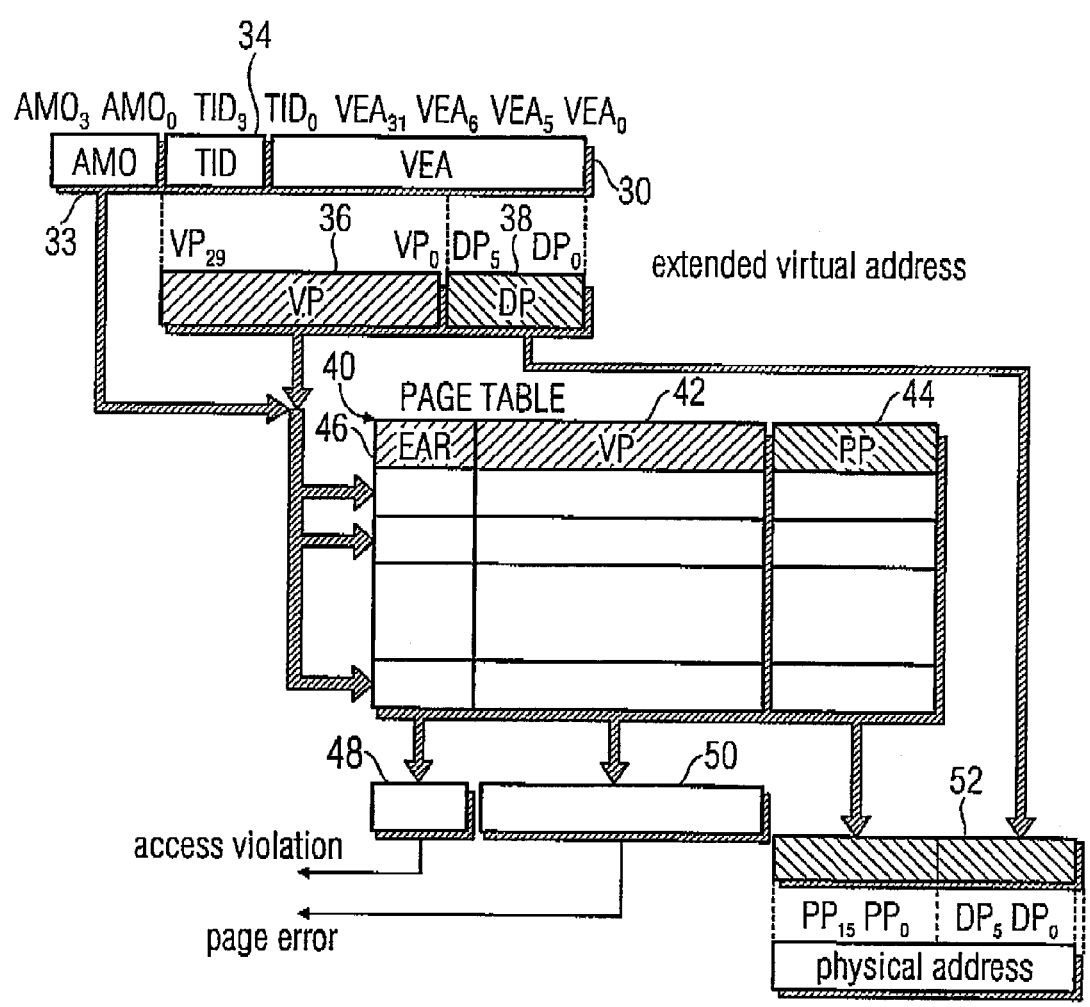
FIG. 3 is an overview representation of an address translation by using a page table.

In the following, reference will be made to FIG. 3. FIG. 3 shows a schematic representation of an address translation where a page table is used. A virtual address 30, an AMO field 3233 and TID field are used as input. The AMO field 3233 designates the access mode set by the current state of the CPU and the intended type of access (read, write, execute, etc.). The TID field 34 is needed in multitasking operation and provides a task identifier that indicates which task the virtual address 30 is associated to, to distinguish between different virtual address spaces of different applications. The so-called expanded virtual address that comprises the start address for the virtual page (VP 36) and an offset value (DP 38) is obtained from the virtual address 30 and the TID field 34.

The allocation regulation in the form of a page table 40 comprises different entries, wherein each entry has a column 42 for the start address of the virtual page and a column 44 for the start address of the physical page that is associated to the virtual page in column 42. The page table further comprises a column 46 for access rights (EAR; EAR=Effective Access Rights), wherein it is checked with a right module 48 whether the CPU mode set by the AMO field 33 has access to a virtual address, with a certain EAR field. If it is determined that the CPU has no access to a virtual address the address translation is refused and an access violation is output. This access right check takes place before the address translation, which means in the virtual address space, so the CPU can therefore not even obtain the physical address, never mind the content of the memory cell addressed by the physical address. An associative search is carried out in the page table to provide the mapping of the virtual address to the physical address. The virtual address in the page table has to match the field 36 of the extended virtual address. If no such entry is found in the page table, module 50 outputs a page error. If, however, a suitable entry is found, the physical page address is read from column 44. A virtual page can have the same size as a physical page. Then the offset of the virtual address (DP 38) and the offset 52 of the physical address have the same size so that no storage of offset values in the page table or a certain processing of offset values is necessary.

As has already been mentioned with reference to FIG. 1, the memory process unit 18 preferably comprises a TLB to achieve faster addressing. The page table described with reference to FIG. 3 is held in the TLB, wherein the TLB exists optionally additionally to the hardware state machine 18a. The TLB is designed in the form of the cache table shown in FIG. 3 and comprises a list of virtual addresses with respective physical addresses for a fast access. The TLB will then be filled with the last used address pairs and can be updated either randomly or according to aspects of time. It is, for example, one possibility to delete the oldest entry as soon as the TLB is filled up or a new entry has to be added in order to make space for a new entry. The size of the TLB is a hardware factor and can therefore be specifically selected according to the embodiment.

If the hardware resources are limited, for example due to the needed chip space, the TLB will not be designed too large and the hardware state machine will be activated more often, while in other cases where the TLB can be made large the hardware state machine is only active in the beginning, when the TLB, a volatile buffer, is still empty, to fill up the TLB gradually.

Especially due to size limitations for the TLB, often not all virtual pages can be mapped to their respective physical pages via the TLB. Above that, due to the strong over-dimensioning of the virtual address space with regard to the physical address space, not all virtual pages have to be mapped to physical pages, but only virtual addresses for those physical addresses have to be present where actually code or data for the actual running tasks of multitasking environment is stored. If a virtual page is not mapped to a physical page that is either not present or that does not point to an actually present physical memory cell a page error is output which points to the fact that the virtual address was damaged or that an error occurred in address translation.

If no entry with a respective virtual address is found in the TLB, the hardware state machine 18a of FIG. 1 will be activated to convert a virtual address that has not been found in the TLB into a physical address to load the physical address into the TLB, together with its virtual address. For that purpose, as has been discussed, the hardware state machine will access the non-volatile memory (e.g. 12 or 14 of FIG. 1) to determine the physical address by using the mapping regulation that is stored there.

Inventively, a hierarchical tree structure with physically addressed nodes is preferred as mapping. Such a hierarchical tree structure that can also be referred to as multilevel page table mapping regulation has the advantage that not one large page table has to be kept in the non-volatile memory but that instead of a large table several levels or levels with smaller lists can be used. This allows a more efficient management, especially in small physical memory pages.

The hardware state machine 18a is then able to pass through the hierarchical tree structure from node to node, to finally determine a physical address to a given virtual address. This process is called "page table walking".

Figure 4A:
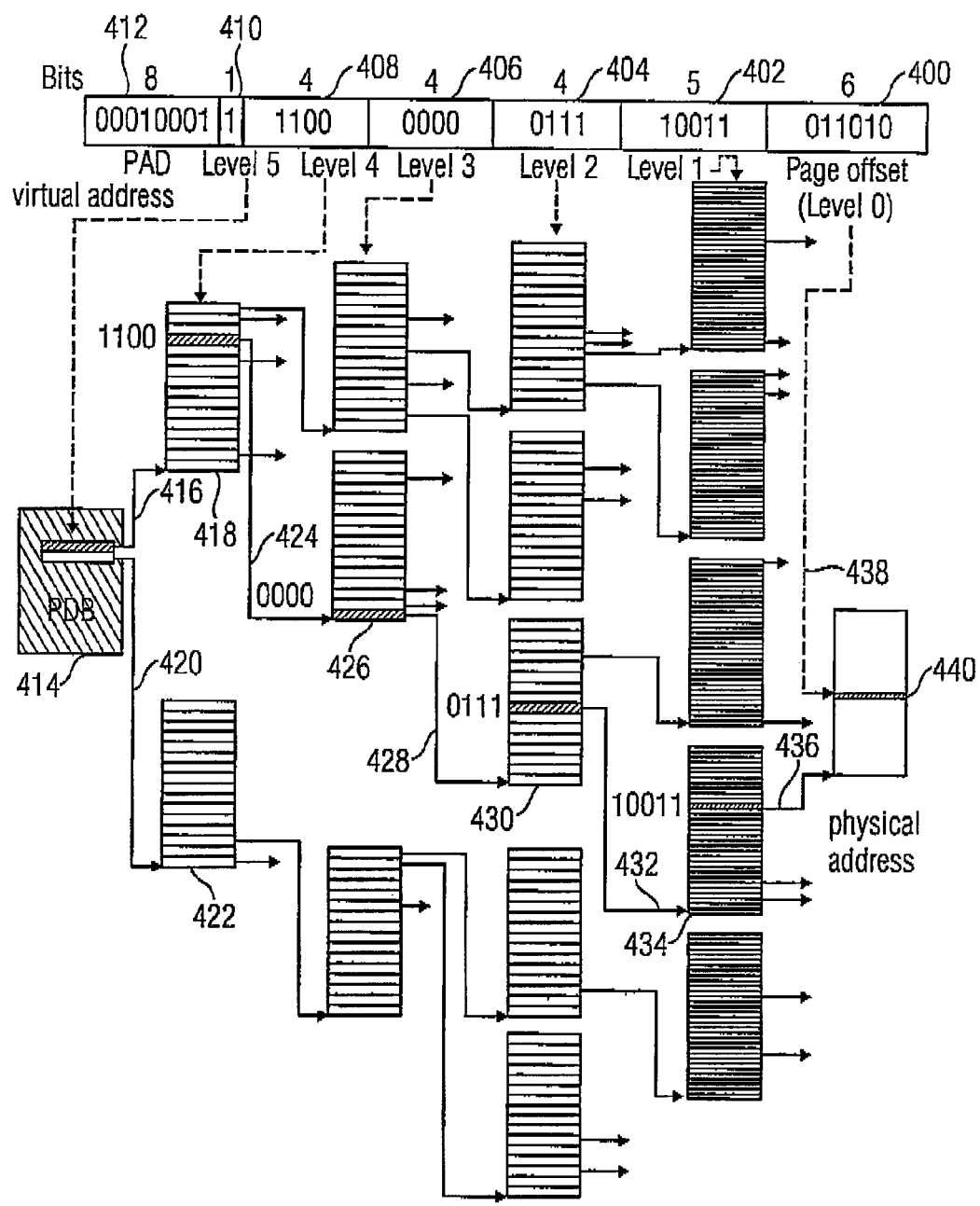
FIG. 4a is a schematic representation of an address translation by using a mapping regulation in the shape of a hierarchical tree structure.

Such a procedure is described according to FIG. 4a. A virtual address 400 shown in FIG. 4a comprises several portions 402 to 410. The portion 410 is associated to a root level, i.e. the highest level. The portion 408 is associated to the next higher level, in the example level 4. The portion 406 of the virtual address 400 is associated to level 3. The portion 404 is associated to level 2, while the portion 402 is associated to level 1, i.e. the end node. The last portion of the physical address that can also be referred to as portion for level 0 contains the page offset that is designated with the reference number 38 in FIG. 3. The virtual address further comprises a so-called package address 412 that addresses a memory package. In the preferred embodiment, the virtual address space is split into 256 packages with the same size so that each package has an address space of 16 MB.

Thereby it is possible, for example, to give away different access rights for different packages of the virtual address space.

The portion 410 of the virtual address 400 that only comprises 1 bit in a preferred embodiment is associated to a root not of the hierarchical tree structure.

The list for the root nodes can be stored in the non-volatile memory or in registers of the memory management unit. Alternatively, the list for the root node can also be stored at a fixed specified position in the physical memory.

The list for the root node is referred to as package descriptor buffer 414 and comprises merely two list entries, due to the fact that the portion 410 of the virtual address 400 only has 1 bit. An entry in the root list 414 comprises an index that is indexed by the bit of the portion 410 of the virtual address. If the bit in the portion 410 has a value of one, as it is the case in the example shown in FIG. 4a, the first entry of the list 414 will be selected. The entry further comprises a pointer 416 to the physical address of the page in the non-volatile memory, where a list 418 for the first intermediate node is stored, that is associated to the portion 408 of the virtual address 400. If, however, the bit in the portion 410 of the virtual address is a zero, then the second entry of list 414 is selected, that comprises a pointer 420 to the physical address of a memory page in the non-volatile memory, wherein another list 422 for the first intermediate node is stored to which the portion 408 of the virtual address 400 is associated. Since the portion 408 of the virtual address comprises four bits, the lists 418 and 422 for the first intermediate node each have 16 entries. Each entry has a length of 32 bits, so that in the embodiment shown in FIG. 4a each list takes up exactly one memory page in the non-volatile memory.

After the hardware state machine has determined the upper entry of the root list 414 due to the portion 410 of the virtual address, the hardware state machine can access the physical memory page where the list 418 for the first intermediate node is stored directly, due to pointer 416. The hardware state machine then reads in the portion 408 of the virtual address 400 and selects the thirteenth entry in the list 418, due to the fact, that the portion has the value "1100".

The thirteenth entry comprises apart from an entry index, again a pointer 424 to a list 426 for another intermediate node to which the portion 406 of the virtual address 400 is associated.

The hardware state machine then reads the portion in, and selects the first entry of the list 426, since the portion 406 has the value "0000".

The first entry in the list 426 again comprises a pointer 428 to a list 430 associated to another intermediate node with lower hierarchy. The hardware state machine now reads the portion 404 of the virtual address in and selects the eighth entry of this list, since the value of the portion 404 is "0111".

The selected entry of the list 430 again comprises a pointer 432 to a physical address of the physical page in non-volatile memory where a list 434 for an end node associated to a portion 402 of the virtual address 400 is stored. The hardware state machine reads the portion 402 of the virtual address in and selects the twentieth entry of the list 434 from the list 434 due to the fact that the value of the portion 402 is "10011". Since the portion 402 of the virtual address 400 is associated to the end level, the selected entry of the list 434 for the end node comprises a pointer 436 to the physical address of the physical page corresponding to the virtual start address of the virtual page. Now, only the page offset has to be added to the physical address that the pointer 436 points to as it is symbolically illustrated by a broken arrow 438 in FIG. 4a, to obtain the physical address 440 associated to the virtual address 400.

It should be noted that the concept described in FIG. 4a could also be used when no memory organization by page is used, but a direct addressing of memory cells without page address and offset value. In this case, the last step illustrated by arrow 438 in FIG. 4 would simply be dropped.

As it has already been discussed, the virtual address space is much larger than the physical address space. For this reason many entries for the different nodes that refer to no next lower node exist for the lists shown in FIG. 4a. In FIG. 4a these are all entries that do not contain an output pointer.

These entries are also referred to as zero entries. For clarity of the representation in all pointers that point to empty space in FIG. 4a the lists associated to them have been omitted. A full mapping regulation would, however, comprise a respective list for each pointer in FIG. 4a.

Apart from the PAD portion 412 the virtual address 400 is divided into six parts or portions in the embodiment shown in FIG. 4a. One level in the address translation process carried out by the hardware state machine is associated to each portion. The highest level, i.e. level 5 indexes, how it has been discussed, one of two entries in list 414. Naturally, the list 414 could also contain several entries. In that case the portion 410 of the virtual address 400 would need to have more bits, correspondingly. With two bits already four entries could be present in the list 414.

FIG. 4b shows the address area that can be addressed by each level. Via the root list 414 (last row of the table in FIG. 4b) the whole 16 megabytes of the virtual address space can be addressed, wherein the upper pointer 416 selects the upper 8 megabytes, while the lower pointer 420 selects the lower 8 megabytes. Therefore, one physical address space can be addressed by 8 megabytes via the list 418 or analogues by the list 422, respectively, wherein each entry of the list 418, i.e. each arrow that points from list 418 can address 512 kilobytes. Each pointer from the list 418 points to a list 426 of the third level (third row of the table of FIG. 4b). Analogous, each pointer from a list of the third level, such as the pointer 428 can again address an address area of 32 kilobytes. The address area of 32 kilobytes is the address area that is covered by the list 430 of the second level, wherein an entry in this list can again address an address area of 2 kilobytes.

Figures 5, 6:
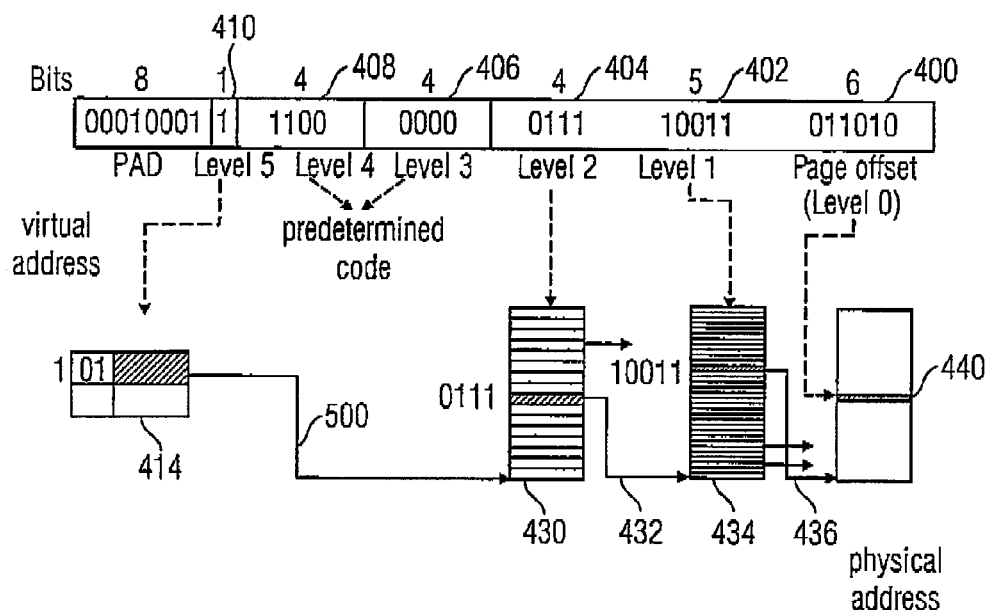

FIG. 5 shows a section from the hierarchical page table structure of FIG. 4a, but with another virtual address that has only ones in the portions 408 and 406 for the fourth level and for the third level, respectively. The mapping regulation in the form of a hierarchical tree beginning with the root list 414 and ending with the physical edges 440 allows skipping of at least one level, in contrary to the mapping regulation shown in FIG. 4a. Skipping a level is signaled in the virtual address by a certain portion, for example by only having ones in one portion, as it is the case in FIG. 5. For skipping one level, however, every other predetermined code could be reserved. The pointer starting from the root list 414 and designed with 500 in FIG. 5 no longer points to a list of the fourth level or the third level, but straight to the list 430 of the second level. Skipping any number of levels or nodes is possible. The bits in the virtual address corresponding to these levels need to have the predetermined code to signal the level skipping to the state machine. This optimization requires additional information for the pointer 500, this additional information being stored in the entries of the root list 414. Of course, only level 3 could be skipped, while the node of level 4 may not be skipped. In this case the additional information has to be present in an entry of a list for the node of level 4.

In the following, reference is made to FIG. 6. FIG. 6 shows a table corresponding to FIG. 4a and FIG. 5 for the meaning of the bits of the virtual address and the connection between the node size, i.e. the maximum number of entries in the node list. In other words, each row of the table in FIG. 6 represents a portion of the level of the virtual address shown on the left in FIG. 6. In the first row of the table of FIG. 6 referring to level 5, which means the root level, it is explained that the portion 410 has only one bit, namely, for example, bit 23 of the virtual address. By one bit two different entries in the root list can be indexed, so that the node size of the root node is 2. The fourth level comprises the bits 19–22. Four bits can index 16 different entries in a list for the fourth level, so that the node size, which means the size for list of the fourth level is 16. The number of lists in the fourth level is 2, since the root list has two entries.

Both the portion for the third level and the portion for the second level have four bits each, so that a list of the second level or the third level can also have a maximum of 16 entries. The portion 402 for the first level comprises five bits, so that 32 entries of a list can be indexed by this portion, as it is apparent from the list 434 for the first level of FIG. 4a, it has 32 rows, while a list of the second level only has 16 rows. The zeroth level, i.e. the page offset starting from a page start address comprises six bits, so that 64 list entries can be indexed. Since a physical page has 64 bytes, minimal offsets of one byte can be addressed. If the page size were, for example 120 bytes, the minimum memory size that can be addressed would be two bytes large.

Figure 7:
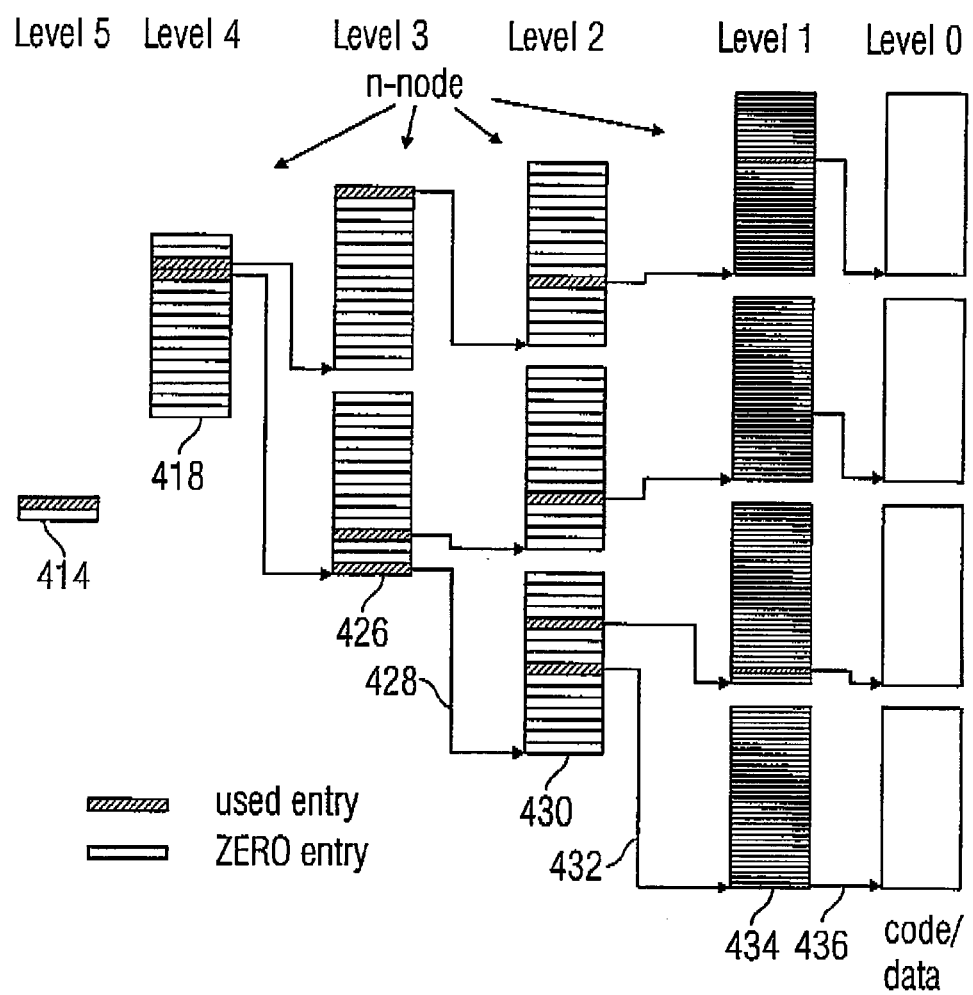
FIG. 7 is an example for a mapping regulation in the shape of an n-tree with same sizes for additional nodes of a level.

In the following, reference is made to FIG. 7. In FIG. 7, like in FIGS. 5 and 4a, used entries in a list are shown bold, while zero entries are illustrated as non-filled rectangles. From the mapping regulation shown in FIG. 7 it becomes clear that a lot of zero entries and only a few used entries are present. This is due to the fact that the virtual address space is much larger than the physical address space. In the preferred embodiment of the present invention, a virtual address space is 4 gigabytes large, while the physical address space is only 4 megabytes large. If a memory organization by pages is used, still, however, a memory page has to be provided for each list shown in FIG. 7. In the example for a mapping regulation shown in FIG. 7, therefore 10 memory pages have to be used, in order to manage merely 4 physical pages where code or data are present. In applications where a sufficient amount of non-volatile memory exists for storing the lists for the levels, this is of no importance.

If, however, memory space is limited and a valuable resource, it is preferred to compress the n-node lists to enlarge the ratio of the number of used entries of a list to the total amount of entries in the list. Therefore, a transition from the so-called n-nodes to the q-nodes is performed. While the expression "n-node" means that all lists of one node of one level have the same number of entries, namely n entries, the expression "q-node" means that the node list is compressed and that the number of entries in a list for the same level can vary from list to list.

Partly filled node lists will be compressed and, as it is especially discussed with reference to FIG. 11, several compressed nodes can be stored on one page of the physical memory area. The compressed nodes are called q-nodes, the hierarchical tree structure with compressed nodes being referred to as q-tree.

The theory behind a q-node is that all used entries of one list, i.e. all non-zero pointers can be placed in an n-node in a structure (the q-node), that is smaller than the original n-node. This is achieved by dividing the n-node into smaller portions, wherein for a maximum compression the smallest portion comprising all non-zero pointers is taken. To specify the position of a pointer in the n-node an offset value for the q-node pointer is needed. This offset value is also called virtual offset.

In the following, reference is made to FIG. 8, to illustrate a possible compression type of a list 800 of an n-node. The list 800 comprises two non-zero entries that can be indexed binary by 1100 and 1110. Besides the list 800 possible q-nodes are illustrated. In principal, three different "compressed" lists, i.e. q-nodes, 802, 804 and 806 can be generated in the described compression by portions. The list 802 corresponds to the list 800. This is a trivial form of compression, the q-node list 802 has the same size as the list 800 and no offset bit is needed. The list 804, however, is already compressed to one half of the memory space. The list comprises two entries that can be indexed with 110 and 100. To get from the entries of the compressed list 804 to the entries of the non-compressed list 800, a virtual offset bit is needed, having a value of 1. The virtual offset bit corresponds to the most significant bit (msb) of both entries of the list 800. The compression is therefore possible if the msbs of the non-zero entries of list 800 are equal. Since the most significant bits of the entries of the compressed list 804 are also equal, an even higher compression can be achieved, as is shown by the compressed list 806. The two non-zero entries of list 806 have most significant bits that are not equal, so that no further compression is possible. To get back to the uncompressed list 800 from the compressed list 806 two offset bits are needed, namely the two most significant bits of the entries in list 800 that are equal for both non-zero entries in the list.

Depending on the extent of the compression of a node (no compression, a compression of 16 entries to 8 entries and finally a compression from 16 entries to 4 entries) the virtual offset value is zero, one bit or two bits. The compression to 8 entries, i.e. half a memory page, means that the pointers in the original n-node are only either in the upper or the lower half. The virtual offset therefore has to be 1 bit to specify the position, wherein the offset bit with a value of zero means that all non-zero entries are in the lower half, while an offset bit of one means that all entries of the list are in the upper half of the n-node list 800.

Figure 8:
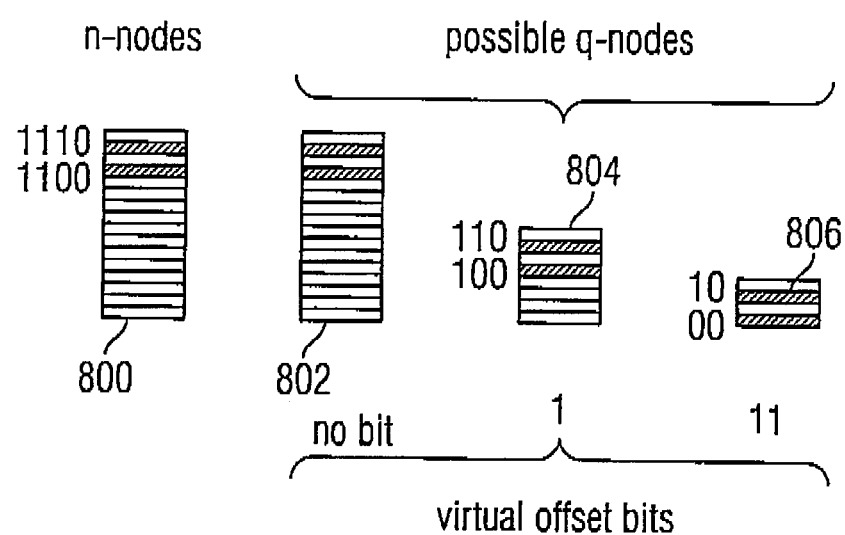
FIG. 8 is a schematic representation of a compression method for node lists to improve the ratio of used entries to the total number of entries in a list.

Analogous to that, as has been illustrated referring to FIG. 8, a further compression is possible in list 800, since all non-zero entries are not only in the upper half but even in the upper quarter of the list. In this case the offset bits are at a value of "11", which shows that the pointers in the n-node list can be found in the fourth quarter. If no compression is carried out (list 802), since the compression method does not allow any compression, as is illustrated referring to FIG. 9, no offset bits are needed. The size of the list in the next lower node is specified in the node list comprising the pointer pointing to the next lower (compressed) node. If, for example, the list 430 in FIG. 4a is compressed, for example by one half, then the entry 426 of the next higher list would also specify the size of the list, apart from the physical address where the list 402 is stored. The list 430 would then only be 8 entries large, for example by a compression by one half, although the portion 404 of the virtual address corresponding to level 2 has 4 bits and actually indexes a 16 entry list. The portion 404 of a virtual address would then be designed such that one of its bits, typically the most significant bit will be interpreted as virtual offset bit.

Another control mechanism results therefrom. The hardware state machine will compare the most significant bit of the portion 404 with the size bit in the non-zero entry of the list 426 and, when they match, continue an address translation, while, if the bits do not match, a page error is output since then at least either the mapping regulation or the virtual address are faulty.

In the following, reference is made to FIG. 9 to illustrate further examples how n-nodes can be reduced to their minimal q-nodes, if the compression method described referring to FIG. 8 is used. The list 900 in FIG. 9 comprises merely one non-zero entry which is indexed with the bit combination "1100". The minimum q-node merely comprises a single entry and, accordingly, 4 virtual offset bits "1100". A list 900 of merely one single non-zero entry can therefore be reduced by about 1/16 with regard to its memory space need in a simple way.

The list 902 comprises two non-zero entries that can be indexed with "0001" and "0011". The two entries have two equal most significant bits, so that two virtual offset bits 00 are formed and the list can be reduced by one quarter.

The list 904 comprises two non-zero entries, whose most significant bits, however, are not equal, so that in the selected exemplary compression algorithm no compression can be achieved. The q-node therefore has the same size as the n-node.

The exemplary list 906 comprises two entries with "0100" and "0101". The three most significant bits are equal, so that a compression by 1/8 can be achieved, which leads to the virtual offset bits "010".

The exemplary list 908 comprises four non-zero entries between "1010" and "1101". All four entries have the same most significant bit, so that a compression by one half can be achieved, which leads to a virtual offset bit of "1".

It should be noted that the q-nodes of level 1 (FIG. 4a) play a specific part. Since their entries do not point to further q-nodes, but directly to the physical memory pages no additional information, such as a size value of a hierarchically lower q-list, have to be stored together with the pointers. Consequently, an entry in a list on level 1 is used to store two pointers. Therefore, portion 402 of the virtual address associated to level 1 comprises five virtual address bits. The additional bit specifies, which of the pointers should be used in the selected q-node entry. It should be noted that one of the two pointers could also be zero. After an entry in a list of level 1 stores two pointers, the list length of a list, such as list 434 of FIG. 4a, has twice the size as the length of a list of a higher level, such as level 430.

In the following, reference will be made to FIG. 10, to illustrate how the compressed q-nodes can be used to minimize storage utilization. First, the minimum q-nodes of a hierarchical mapping regulation are identified, for example according to the table of FIG. 9. Therefrom a mapping regulation as illustrated in FIG. 10 results. The filled rectangles designate used entries, while the non-filled rectangles designate zero entries. A thick line borders each q-node. It can be seen that in the selected example of the mapping regulation, all lists can be compressed, apart from a list 1000. The list 1000 could not be compressed with the selected compression method since the two non-zero entries that it comprises are not listed in the same half of the list.

In the mapping regulation shown in FIG. 10, still all, even the compressed lists are stored at respective own physical memory pages or page frames, so that the page frames are occupied very loosely, however, no reduction of the number of pages frames has been achieved. In the embodiment shown in FIG. 10, the non-occupied words in the page frames can, however, already be occupied by other data, so that in a physical memory page a list for the mapping regulation and additionally further data can be stored. Due to memory management reasons it is preferred to turn to a concept according to FIG. 11, to concentrate the mapping regulation information, which means the lists for the individual levels, in as few physical memory pages as possible, so that complete memory pages can be made available to be able to store other data in them.

Figure 11:
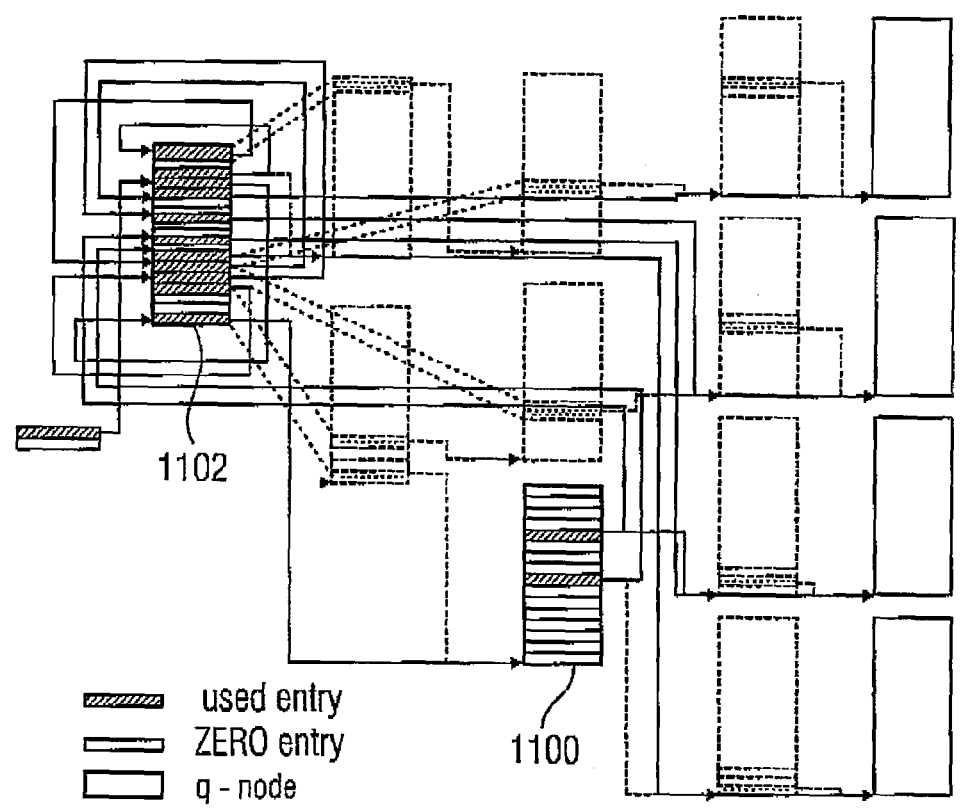
FIG. 11 is a memory space optimized storage of the tree of FIG. 10.

Since most q-nodes are small, all node lists apart from a node list 1100 can be packed into the same physical memory page 1102 in the mapping regulation illustrated in FIG. 11. Consequently, the mapping regulation or the page association structure will be reduced from 10 to 2 memory pages. In this way the q-tree structure provides a significant optimization in comparison to the option shown in FIG. 4a, where no list compression has been carried out.

The only "wasted" memory is existent due to the lists that comprise several zero pointers and cannot be compressed any further. The list 1100 falls into that category. Experience has shown, however, that only very few such q-nodes exists. Normal programs usually use at least several connected memory areas, such as code, statistical data, stack and heap. Memory layouts of this type have a smaller overhead for the association structure. Still, fragmented memory layouts are sometimes necessary.

Figure 9:
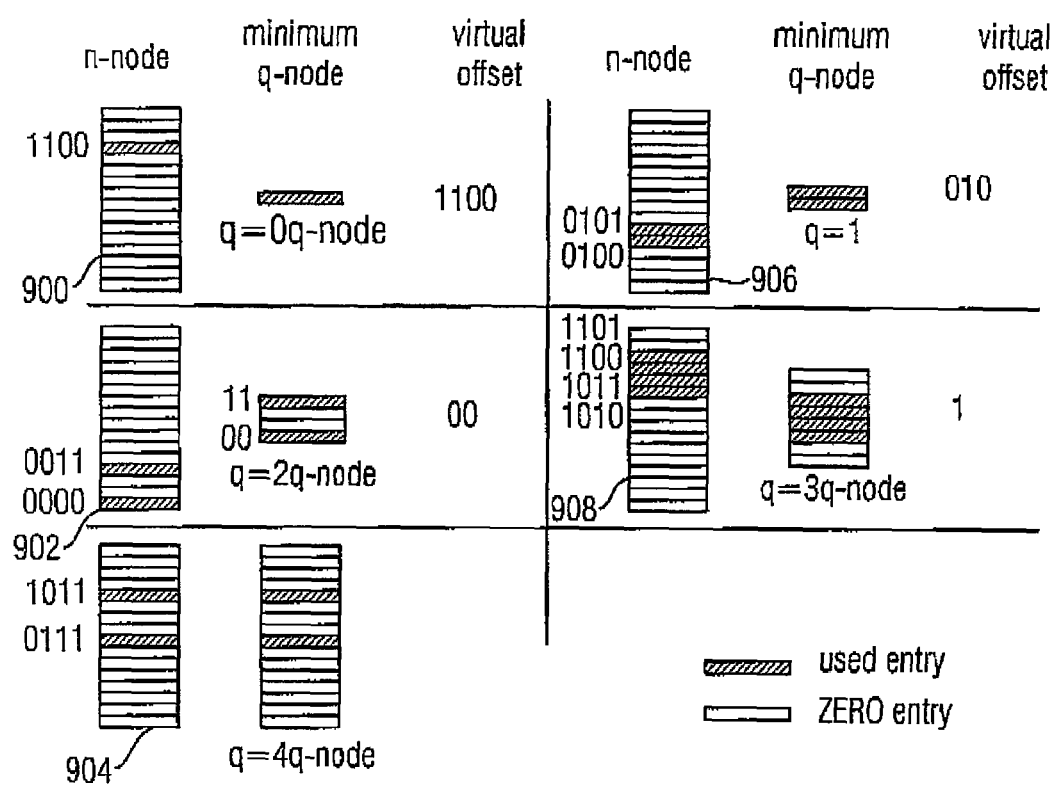
FIG. 9 is compression examples according to the compression method of FIG. 8.
Figure 10:
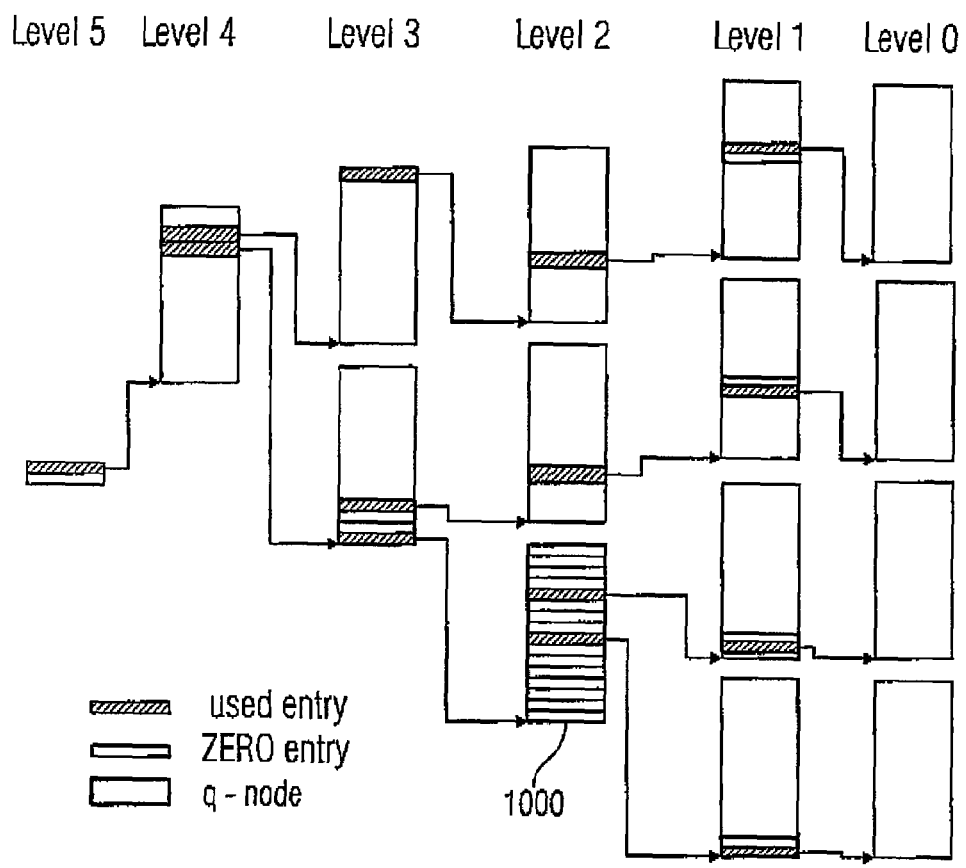
FIG. 10 is a compressed representation of the tree of FIG. 7.

Although in the above merely the list compression function described in more detail in FIG. 9 has been illustrated, it should be noted that all list compression methods could be used. The compression does not exclusively have to be based on entries having to be in the same half or in the same quarter of the list, respectively. That way, list 1100 could, for example, be compressed by using an alternative compression method based on entries being in different halves of the list. Depending on the layout of the virtual address and the meaning of the offset bits in a portion of the virtual address, several different compression methods can be combined, if the memory requests are such that even a small number of lists that cannot be compressed, such as list 1100 of FIG. 11, is not acceptable.

Figure 12:
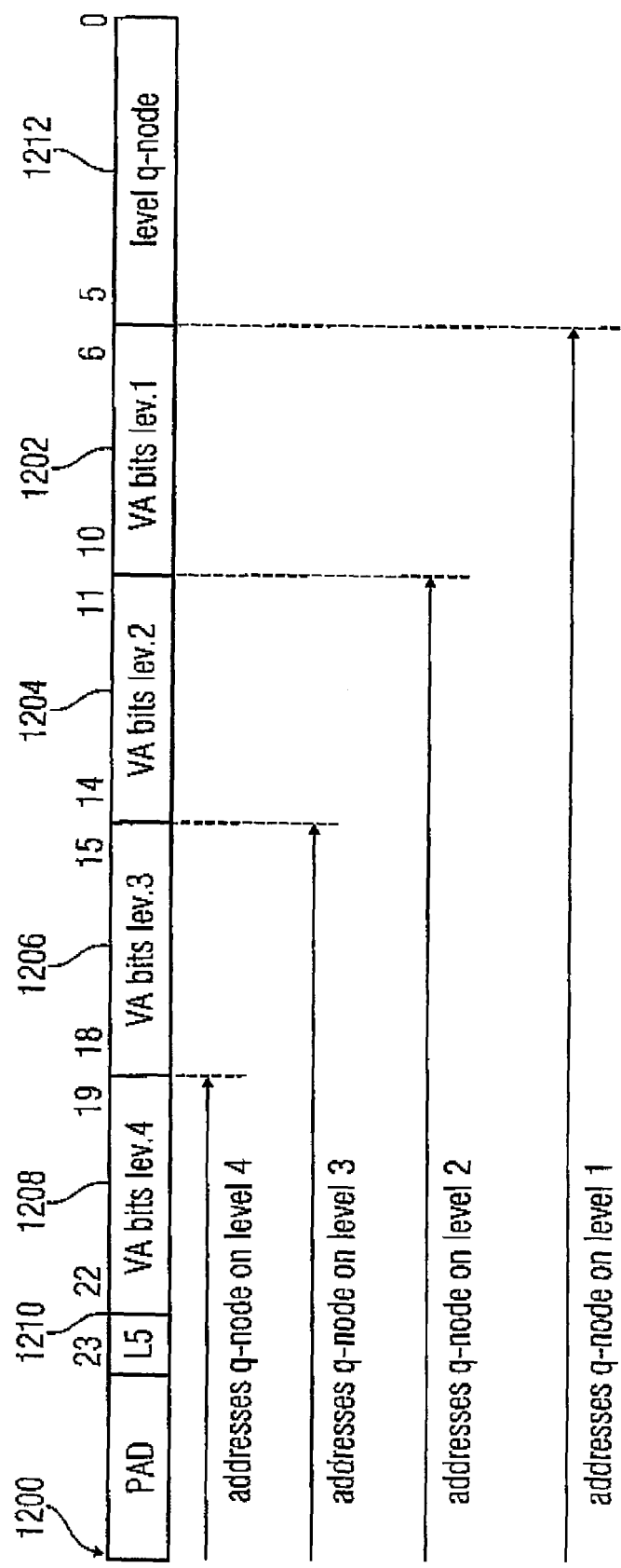
FIG. 12 is a representation of a virtual address modified to reference to a physical address where a node list is stored.

In a preferred embodiment of the present invention a node-addressing mode (NAM) is provided, to be able to modify the mapping regulation in non-volatile memory. Therefore, the format for a virtual address 1200 illustrated in FIG. 12 is used. The virtual address is, like in FIG. 4a, divided into several portions, wherein portions 1210 to 1202 basically correspond to portions 410 to 402 in FIG. 4a. The last portion 1212, designating the offset value in FIG. 4a, is, however, used in the virtual address 1200 for signaling the q-node level whose list is to be modified in the NAM mode.

The NAM mode is used to manipulate virtual addresses since, due to security aspects, only a virtual addressing mode should be used, so that the CPU has no direct access to physical pages. By setting the portion 1212 of the virtual address 1200, lists for individual levels and especially the entries in those lists can be accessed.

Therefore each package descriptor, which is stored in the root list 414, i.e. the package descriptor buffer, comprises a NAM bit, that allows access to the q-node list for this special memory package, if it is set. It should be noted that only packages in privileged layers, i.e. privileged modes of the memory of the operating system, could manipulate the NAM bit. If the NAM bit is set, the last portion 1212 of the virtual address is not considered as page offset value any longer, but is used to signal to the hardware state machine whether the q-node should be addressed on level 4, level 3, level 2 or level 1, respectively, to access the list or the entries in the respective list.

If the NAM bit is set, the virtual address of the hardware state machine is therefore interpreted different to the case described in FIG. 4a.

The hardware state machine carries out an address translation when the NAM bit is set, only until the q-node of the stop level defined by portion 1212 is retrieved. Then, a final bus cycle is generated on the physical page designated by the pointer of an entry in a list for the defined stop level. Then, the requested list data will be accessed and they are preferably stored in the data cache 20 (FIG. 1). It should be noted that this address translation is not stored in TLB 18b (FIG. 1), since this is the mapping regulation itself and not an allocation of a virtual address to a physical address.

Figure 13:
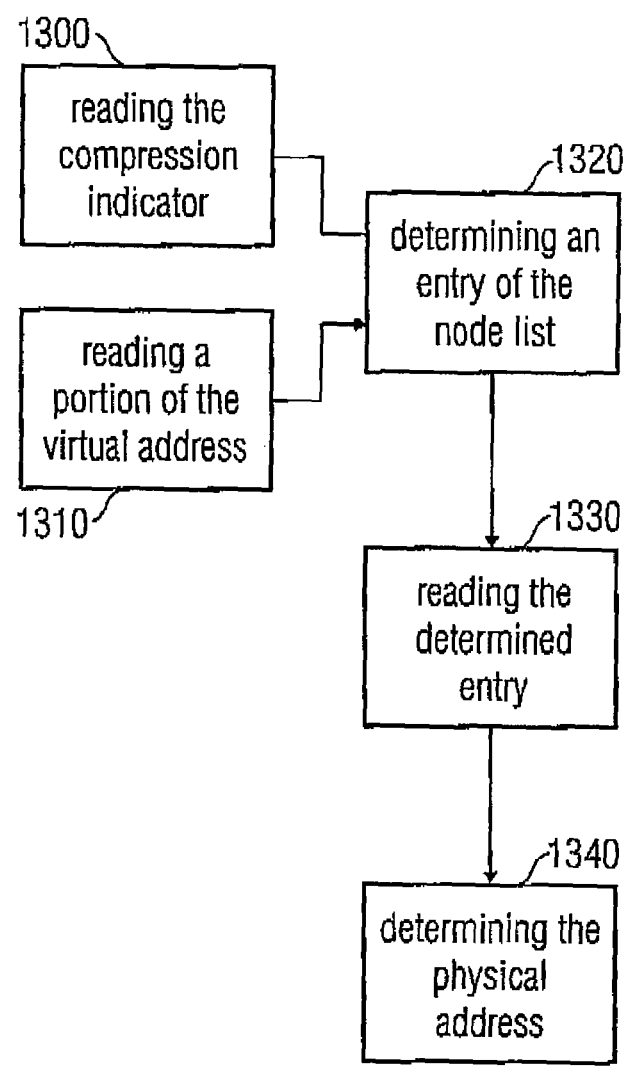
FIG. 13 is a block diagram of an inventive apparatus for determining a physical address from a virtual address by using a hierarchical mapping regulation.

FIG. 13 shows an apparatus for determining a physical address from a virtual address according to the present invention. The apparatus comprises means 1300 for reading the compression indicator from the mapping regulation, means 1310 for reading a portion of the virtual address (400, 402, 404, 406, 408, 410 of FIG. 4a), means for determining an entry of the node list of a node of the node level associated to the read portion of the virtual address, by using the portion read by means 1310 and the compression indicator read by means 1300. This means is designated with reference number 1320 in FIG. 13. The inventive apparatus further comprises means 1330 for reading the entry of the node list determined by means 1320, to identify a node of a hierarchically lower node level, which is referenced by the determined entry. The apparatus according to the present invention further comprises means 1340 for determining the physical address by using the node of the hierarchically lower node level, which is referenced by the determined entry. Means 1340 is disposed to carry out the remainder of the address translation, i.e. to process all remaining portions of the virtual address. The functionality of means 1340 can, if further portions of the virtual address are present, comprise the functionality of means 1300 to 1340. If, however, the determined entry determined by means 1330 is already from level 1 (402 in FIG. 4a), means 1340 will determine the physical address 440 of FIG. 4a by reading the page offset (level 0) from the virtual address in order to be able to access the correct memory space 440 in the physical memory page identified by the entry.

If, however, referring to FIG. 4a, the determined entry is the entry from node level 4 (408 in FIG. 4a), i.e. the same comprises a predetermined code, then means 1340 will skip at least one level to process compressed nodes of lower node levels or uncompressed nodes of lower node levels until all portions of the virtual address are processed and the physical address 440 is calculated directly or, in the case of a memory organization by pages, by using an offset value.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

We claim:

1. A method for determining a physical address associated with a corresponding storage location in a physical memory space from a virtual address by using a hierarchical mapping regulation with a plurality of hierarchically arranged node levels, wherein a virtual address space associated with the virtual address is larger than the physical address space, the virtual address having a plurality of portions, each portion of the virtual address being associated to a corresponding node level of the virtual address space, each node level having at least one node, each node having a node list with corresponding list entries, each list entry of an associated node list referring to one of a corresponding node of a hierarchically lower node level and an associated physical address, wherein a length of each portion of the virtual address defines a maximum number of list entries included in each node belonging to the node level associated to the portion, wherein at least one node of the plurality of node levels is a compressed node including an associated node list having fewer than the maximum number of list entries, wherein the hierarchical mapping regulation includes a compression indicator associated to said at least one compressed node, and wherein the method comprises:

reading the compression indicator;

reading a portion of the virtual address;

determining an entry in a node list of a node of a node level associated to the read portion of the virtual address, by using the read portion of the virtual address and the compression indicator;

reading the determined entry of the node list to identify a node of a hierarchically lower node level referenced by the determined entry; and determining the physical address by using the node of the hierarchically lower node level referenced by the determined entry.

2. The method according to claim 1, wherein the compression indicator is stored at a predetermined position in the node list of the compressed node, and wherein reading the compression indicator comprises jumping to the predetermined portion to read the compression indicator.

3. The method according to claim 1, wherein the compression indicator for a compressed node is stored in the list entry of a node list of a node of a hierarchically higher node level, and wherein reading the compression indicator comprises obtaining the compression indicator by reading a list entry of a node list of the node of the hierarchically higher node level.

4. The method according to claim 1, wherein a node list of a compressed node is compressed such that the number of list entries in comparison to the maximum number is halved, if the most significant bit of each list index for all list entries is non-zero, and wherein in the step of determining the compression indicator is interpreted such that the most significant bit of the portion of the virtual address is ignored in determining the entry.

5. The method according to claim 1, wherein a node list of a compressed node is compressed such that the number of list entries is quartered in comparison to the maximum number, if the two most significant bits of each list index for all list entries are non-zero, and wherein in the step of determining the compression indicator is interpreted such that the two most significant bits of the virtual address are ignored in determining the entry.

6. The method according to claim 1, wherein an addressing by pages of the physical memory is provided, wherein a memory page is addressable via a base address and an offset value, wherein the node lists of at least two compressed nodes are stored in the same physical memory page, and wherein a list entry of a node list of a node of a hierarchically higher node level comprises both a base address and an offset value for the memory page, where the node list for the node is stored, which is referenced by the entry, and wherein in the step of determining the entry the determination is carried out by using the base address and the offset value.

7. The method according to claim 1, wherein, in determining the physical address, the steps reading the compression indicator, reading a portion of the virtual address, determining an entry of the node list and reading the determined entry, are carried out until the hierarchically lowest node level is reached.

8. The method according to claim 1, wherein a predetermined value of a portion of the virtual address shows that a node level is skipped.

9. An apparatus for determining a physical address associated with a corresponding storage location in a physical memory space from a virtual address by using a hierarchical mapping regulation with a plurality of hierarchically arranged node levels, wherein a virtual address space associated with the virtual address is larger than a physical address space, the virtual address having a plurality of portions, each portion of the virtual address being associated to a corresponding node level of the virtual address space, each node level having at least one node, each node having a node list with corresponding list entries, each list entry of an associated node list referring to one of a corresponding node of a hierarchically lower node level and an associated physical address, wherein a length of each portion of the virtual address defines a maximum number of list entries included in each node belonging to the node level associated to said each portion, wherein at least one node of the plurality of node levels is a compressed node including an associated node list having fewer than the maximum number of list entries, wherein the hierarchical mapping regulation includes a compression indicator associated to said at least one compressed node, and wherein the apparatus comprises:

means for reading the compression indicator;

means for reading a portion of the virtual address;

means for determining an entry in a node list of a node of the node level associated to the read portion of the virtual address, by using the virtual address, by using the read portion of the virtual address and the compression indicator;

means for reading the determined entry of the node list to identify a node of a hierarchically lower node level which is referenced by the determined entry; and means for determining the physical address by using the node of the hierarchically lower node level which is referenced by the determined entry.

10. A computer system comprising:

a physical memory including a plurality of storage locations, each storage location having an associated physical address; and an apparatus for determining a selected physical address from a virtual address by using a hierarchical mapping regulation having a plurality of hierarchically arranged node levels, wherein the virtual address includes a plurality of portions, each portion of the virtual address being associated to a corresponding node level of the virtual address space, each node level having at least one node, each node having a node list with corresponding list entries, each list entry of an associated node list referring to one of a corresponding node of a hierarchically lower node level and an associated physical address, wherein a length of each portion of the virtual address defines a maximum number of list entries included in each node belonging to the node level associated to said each portion, wherein at least one node of the plurality of node levels is a compressed node including an associated node list having fewer than the maximum number of list entries, wherein the hierarchical mapping regulation includes a compression indicator associated to said at least one compressed node, and wherein the apparatus comprises:

means for reading the compression indicator;

means for reading a portion of the virtual address;

means for determining an entry in a node list of a node of the node level associated to the read portion of the virtual address, by using the virtual address, by using the read portion of the virtual address and the compression indicator;

means for reading the determined entry of the node list to identify a node of a hierarchically lower node level which is referenced by the determined entry; and means for determining the physical address by using the node of the hierarchically lower node level which is referenced by the determined entry.

11. The computer system according to claim 10, laid out as a chip card, smart card or security IC.

* * * * *